(12) United States Patent
Kim et al.

(10) Patent No.: US 6,481,297 B2
(45) Date of Patent: Nov. 19, 2002

(54) TORQUE SENSOR FOR AUTOMOBILES

(75) Inventors: Ji-Woong Kim, Kunpo (KR); Ki-Won Kim, Pyungtak (KR)

(73) Assignee: Mando Corporation, Pyungtaek (KR)

( * ) Notice: Subject to any disclaimer, the term of this patent is extended or adjusted under 35 U.S.C. 154(b) by 0 days.

(21) Appl. No.: 09/952,948

(22) Filed: Sep. 14, 2001

(65) Prior Publication Data

US 2002/0129666 A1 Sep. 19, 2002

(30) Foreign Application Priority Data

Mar. 16, 2001 (KR) ............................................. 01-13638

(51) Int. Cl.[7] .................................................. G01L 3/02
(52) U.S. Cl. .................................................. 73/862.331
(58) Field of Search ...................... 73/862.331, 862.332, 73/862.333, 862.334, 862.335, 862.336

(56) References Cited

U.S. PATENT DOCUMENTS 5,493,921 A * 2/1996 Alasafi et al. ............. 73/118.1
5,542,304 A * 8/1996 Sasada et al. ............ 73/862.06
5,796,014 A * 8/1998 Chikaraishi et al. ..... 73/862.28

FOREIGN PATENT DOCUMENTS

JP        11-51789        2/1999

* cited by examiner

*Primary Examiner*—Max Noori
(74) *Attorney, Agent, or Firm*—Ladas & Parry

(57) ABSTRACT

Disclosed herein is a torque sensor for automobiles. The torque sensor includes a torsion bar for coaxially connecting an input shaft attached to a steering wheel and an output shaft attached to a steering mechanism. A plurality of detection rings are mounted on the circumferential surfaces of the input and output shafts. At least one detection coil assembly is arranged to surround the gaps between the detection rings. A sensor housing is provided to accommodate the detection coil assembly. A position securing element is secured to the sensor housing to be brought into tight contact with the side surface of the detection coil assembly through the side of the sensor housing with a friction plate interposed between the detection coil assembly and the position securing element for securing the position of the detection coil assembly.

13 Claims, 5 Drawing Sheets

TORQUE SENSOR FOR AUTOMOBILES

BACKGROUND OF THE INVENTION

1. Field of the Invention

The present invention relates generally to a power steering system, and more particularly to a torque sensor for automobiles.

2. Description of the Prior Art

In general, for large-scale automobiles, vehicles with low air pressure tires, wide tires or the like, the resistance of the ground to the rotational movement of wheels is great. When the resistance of the ground is great, a large amount of manipulating force is required to manipulate a steering wheel, thereby causing the manipulation of the steering wheel to be difficult. In order to overcome such a problem, a power steering apparatus has been employed in an automobile. In such a power steering apparatus, an auxiliary power unit is mounted on a steering apparatus to reduce the force required to manipulate the steering wheel is reduced by the servo action of the auxiliary power unit.

The steering shaft of an automobile, on which a power steering apparatus is mounted, is comprised of input and output shafts. The input shaft is attached to a steering wheel, while the output shaft is attached to a pinion gear engaged with the rack bar of a tie rod. The input and output shafts are connected to each other by a torsion bar. In such a structure, when the steering wheel is rotated, the output shaft is rotated and, finally, directions of wheels connected to the tie rod are changed by the gear action of the pinion gear and the rack bar. However, when the resistance of the ground to the rotation of the wheels are great, the gear action of the pinion gear and the rack bar is not smooth. Accordingly, the output shaft connected to the pinion gear is rotated less than the input shaft connected to the steering wheel, resulting in the twist of the torsion bar. The degree of the twist of the torsion bar is input to an electronic control unit in the form of a signal, and the electronic control unit operates an auxiliary power unit to compensate for the difference between the rotation of the input and output shafts on the basis of the signal. As a result, the manipulation of the steering wheel is improved. In such a case, the twist of the torsion bar is detected by the torque sensor.

FIG. 1 is a cross section showing a conventional torque sensor for automobiles. As illustrated in FIG. 1, the conventional torque sensor for automobiles is comprised of a torsion bar 3 for coaxially connecting the lower end of an input shaft 1 and the upper end of an output shaft 2, three detection rings 4a, 4b and 4c made of magnetic material and arranged on the connected portions of the input and output shafts 1 and 2 to be regularly spaced from each other, and a barrel-shaped sensor housing 5 within which the detection rings 4a, 4b and 4c are fitted.

The output shaft 2 is connected at its lower end to a pinion gear (not shown) engaged with a rack bar formed on a tie rod (not shown), while the upper end of the input shaft 1 is fixedly attached to a steering wheel (not shown). As the torsion bar 3 connecting the input and output shafts 1 and 2 is twisted by the rotation of the steering wheel, the output shaft 2 is rotated.

The detection rings 4a, 4b and 4c include a first detection ring 4a, a second detection ring 4b and a third detection ring 4c. The first and second detection rings 4a and 4b are fitted on the input shaft, and rotated at the substantially same angle as the steering wheel. The third detection ring 4c is fitted on the output shaft 2 to be rotated together with the output shaft 2. Three toothed portions 4d, 4e and 4f are formed on the lower surfaces of the first and second detection rings 4a and 4b and the upper surface of the third detection ring 4c, respectively.

A temperature compensating detection coil assembly 6 and an magneto-resistance detection coil assembly 7 are arranged in the sensor housing 5 to surround the toothed portions 4d, 4e and 4f of the detection rings 4a, 4b and 4c and form an magneto-circuit in conjunction with the detection rings 4a, 4b and 4c. The temperature compensating detection coil assembly 6 is disposed to surround the gap between the first and second detection rings 4a and 4b, and the magneto-resistance detection coil assembly 7 is arranged to surround the gap between the second and third detection rings 4b and 4c. A spacer 8 is interposed between the temperature compensating detection coil assembly 6 and the magneto-resistance detection coil assembly 7. The opposite area of the toothed portions 4e and 4f of the second and third detection rings 4b and 4c is varied by the twisting of the torsion bar 3, the inductance value of the magneto-resistance detection coil assembly 7 is varied by the variation of the opposite area, and the rotational difference of the input and output shafts 1 and 2 is determined by the measurement of the variation of the inductance value.

The detection coil assemblies 6 and 7 are securely held in position in the sensor housing 5 so as to precisely detect torque applied to the torsion bar 3. In order to secure the position of the detection coil assemblies 6 and 7, a ring-shaped stopper screw 9 having a certain thickness is engaged with the sensor housing 5 under the magneto resistance detection coil assembly 7, so the detection coil assemblies 6 and 7 are held in the longitudinal direction of the detector housing 5. External threads are formed on the circumferential surface of the stopper screw 9, and engaged with the lower portion of the inner surface of the sensor housing 5 on which interior threads are formed.

In the process of engaging the stopper screw 9 with the lower portion of the sensor housing 5, when the stopper screw 9 is brought into contact with the lower surface of the magneto-resistance detection coil assembly 7, the position of the magneto-resistance detection coil assembly 7 and the temperature compensating detection coil assembly 6 may be changed by the frictional force between the upper surface of the stopper screw 9 and the lower surface of the magneto-resistance detection coil assembly 7. Additionally, the sensor housing 5 and the detection coil assemblies 6 and 7 are made of different materials, so they have different thermal expansion coefficients, thereby causing them to be expanded to different extents. The variations in the volumes of the sensor housing 5 and the detection coil assemblies 6 and 7 due to the different thermal expansions cause the sensor housing 5 and the detection coil assemblies 6 and 7 to be damaged. In consideration of the above problem, the detection coil assemblies 6 and 7 are positioned in the sensor housing 5 to be spaced apart from the inner surface of the sensor housing 5. Additionally, when the detection coil assemblies 6 and 7 are secured by the stopper screw 9, the stopper screw 9 is slightly spaced apart from the magneto-resistance detection coil assembly 7.

However, if vibration or impact is transmitted to the interior of the torque sensor through slight gaps between the sensor housing 5 and the detection coil assemblies 6 and 7 and between the magneto-resistance detection coil assembly 7 and the stopper screw 9, the positions of the temperature compensating detection coil assembly 6 and the magneto-resistance detection coil assembly 7 are varied, thereby causing the problem that torque applied to the torsion bar 3 is not precisely detected.

SUMMARY OF THE INVENTION

Accordingly, the present invention has been made keeping in mind the above problems occurring in the prior art, and an object of the present invention is to provide a torque sensor for automobiles, in which the torque sensor of a power steering apparatus is improved, so the positions of detection coil assemblies are not only secured effectively but also the thermal deformation of the torsion bar and the shock of impact applied to the torsion bar are handled without any problem.

In order to accomplish the above object, the present invention provides a torque sensor for automobiles, comprising: a torsion bar for coaxially connecting an input shaft attached to a steering wheel and an output shaft attached to a steering mechanism; a plurality of detection rings mounted on the circumferential surfaces of the input and output shafts; at least one detection coil assembly positioned to surround the gaps between the detection rings; a sensor housing provided to accommodate the detection coil assembly; and a position securing element secured to the sensor housing to be brought into tight contact with the side surface of the detection coil assembly through the side of the sensor housing with a friction plate interposed between the detection coil assembly and the position securing element for securing the position of the detection coil assembly.

Preferably, the position securing element is provided to surround portions of the side surface of the detection coil assembly, and is provided with an opening to allow the position securing element to be inserted into the sensor housing.

Preferably, the friction plate is formed to have the same curvature as that of the side surface of the detection coil assembly, and is formed of rubber to absorb vibration applied to the detection coil assembly and accommodate thermal deformation of the detection coil assembly and the sensor housing.

Preferably, the position securing element is comprised of a body portion having the same curvature as that of the side surface of the detection coil assembly to be brought into tight contact with the side surface of the detection coil assembly, an upper extension portion extended from the upper end of the body portion to be brought in tight contact with the upper surface of the detection coil assembly, a lower extension portion extended from the lower end of the body portion to be brought into tight contact with the lower surface of the detection coil assembly, and a plurality of attachment tabs laterally extended from the side of the body portion to fixedly attach the position securing element to the sensor housing.

Preferably, the attachment tabs and the sensor housing are each provided with a plurality of bolt holes to fixedly attach the position securing element.

Preferably, the body portion of the position securing element and the friction plate are each provided with a through hole so as to allow the interior of the sensor housing to communicate with the exterior of the sensor housing.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
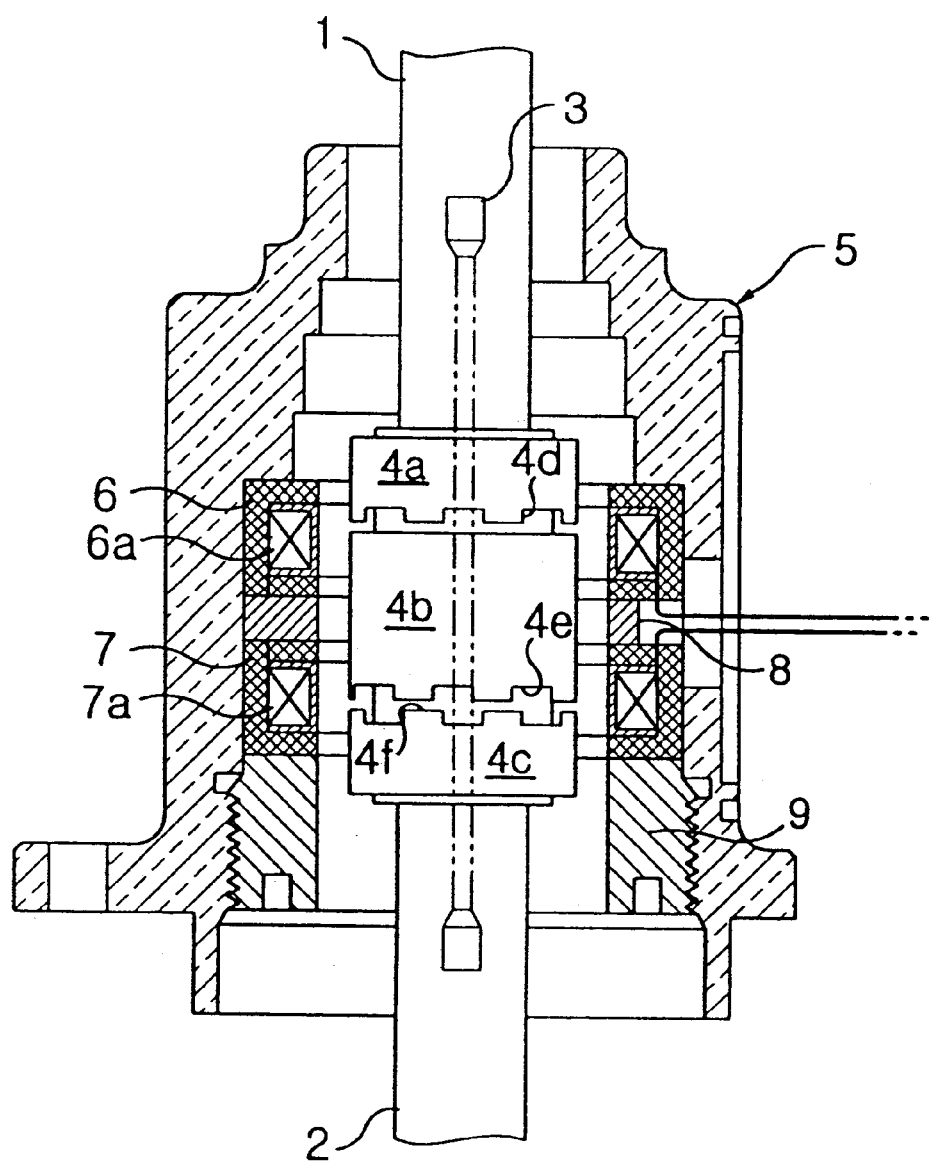
FIG. 1 is a cross section showing a conventional torque sensor for automobiles.
Figure 2:
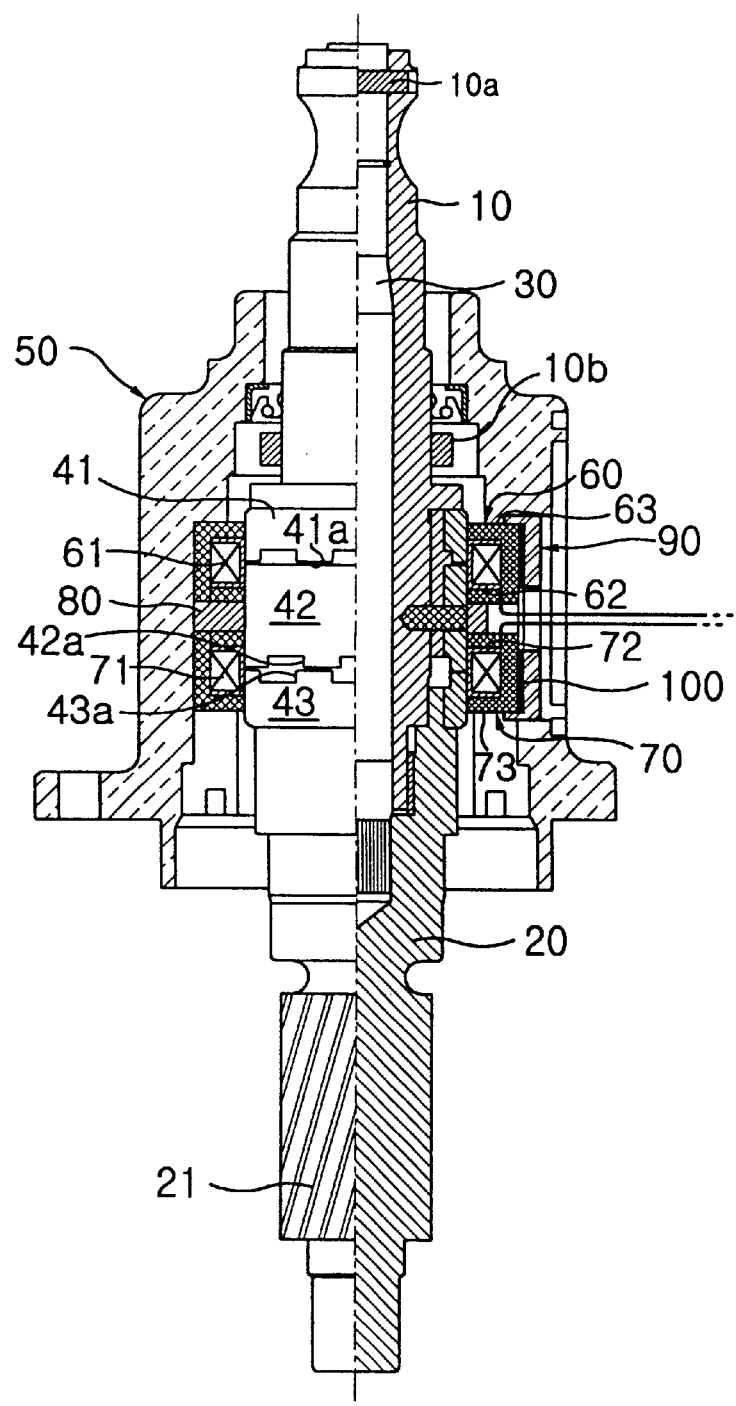
FIG. 2 is a partial cross section showing a torque sensor for automobiles in accordance with the present invention.

As illustrated in FIG. 2, a torque sensor for automobiles in accordance with the present invention is comprised of a torsion bar 30 for coaxially connecting the lower end of an input shaft 10 and the upper end of an output shaft 20, a plurality of detection rings 41, 42 and 43 mounted on one of the input and output shafts 10 and 20, and a sensor housing 50 for accommodating the detection rings 41,42 and 43.

The output shaft 20 is attached to a wheel-side steering mechanism (not shown). A pinion gear portion 21 is formed on the lower portion of the output shaft 20 to be engaged with a rack bar (not shown) formed on a wheel-side tie rod (not shown). The upper end of the input shaft 10 is fixedly attached to a steering wheel (not shown), so the output shaft 20 is rotated by the twisting of the torsion bar 30 that is caused when the friction between the wheels of an automobile and the ground is increased. The upper end of the torsion bar 30 is fixedly attached to the input shaft 10 by a horizontal pin 10a, and the lower end of the torsion bar 30 is tightly fitted into the output shaft 20 extended under the lower portion of the sensor housing 50.

The detection rings 41, 42 and 43 consist of a first detection ring 41, a second detection ring 42 and a third detection ring 43. The detection rings 41, 42 and 43 are fabricated of magnetic material. The detection rings 41, 42 and 43 are mounted on the connected portions of the input and output shafts 10 and 20 to be spaced apart from each other. The first and second detection rings 41 and 42 are mounted on the circumferential surface of the lower end of the input shaft 10, while the third detection ring 43 is mounted on the circumferential surface of the upper end of the output shaft 20. Three toothed portions 41a, 42a and 43a are formed on the lower surfaces of the first and second detection rings 41 and 42 and the upper surface of the third detection ring 43, respectively.

The sensor housing 50 is barrel-shaped and open on its lower and upper surface, so the inner side surface of the sensor housing 50 surrounds the detection rings 41, 42 and 43. The input shaft 10 is inserted into the sensor housing 50 to be rotated in the sensor housing 50 with the aid of a roller bearing 10b.

The detection coil assemblies 60 and 70 are situated around the toothed portions 41a, 42a and 43a of the detection rings 41, 42 and 43 to form a magneto-circuit in conjunction with the toothed portions 41a, 42a and 43a. A temperature compensating detection coil assembly 60 is provided around the gap between the first and second detection rings 41 and 42, while a magneto-resistance detection coil assembly 70 is provided around the gap between the second and third detection rings 42 and 43. The detection coil assemblies 60 and 70 have the same construction. Each of the detection coil assemblies 60 or 70 is comprised of a bobbin 62 or 72 around which a coil 61 and 71 is wound and a bobbin housing 63 or 73 in which the bobbin 62 or 72 is accommodated. A spacer 80 is interposed between the detection coil assemblies 60 and 70.

The detection coil assemblies 60 and 70 are secured in the sensor housing 50 so as to precisely detect torque applied to the torsion bar 30. To this end, a position securing element 90 is attached to the side of the sensor housing 50.

Figure 3:
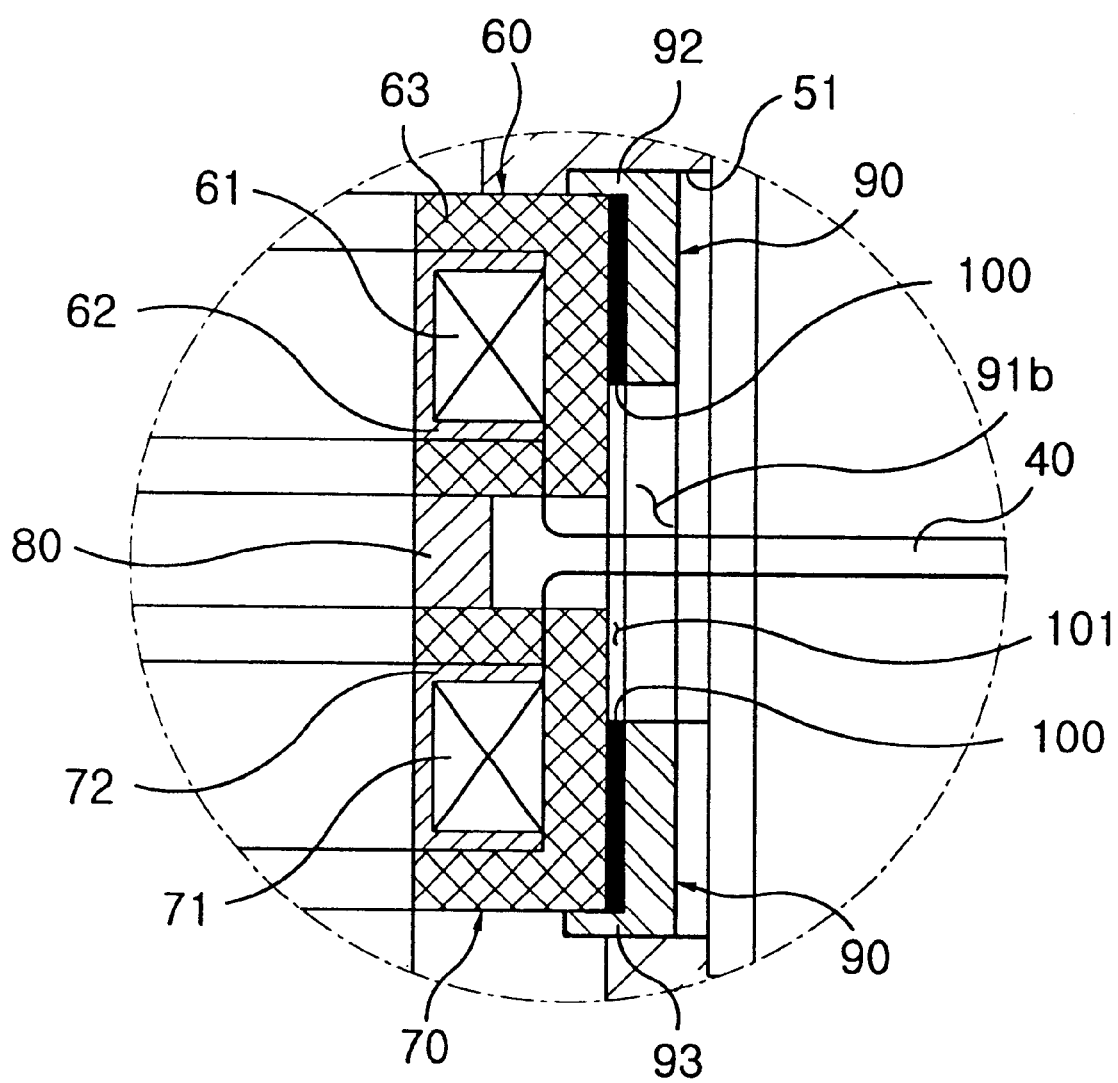
FIG. 3 is an enlarged cross section showing the assembly of a position securing element of the present invention.
Figure 4:
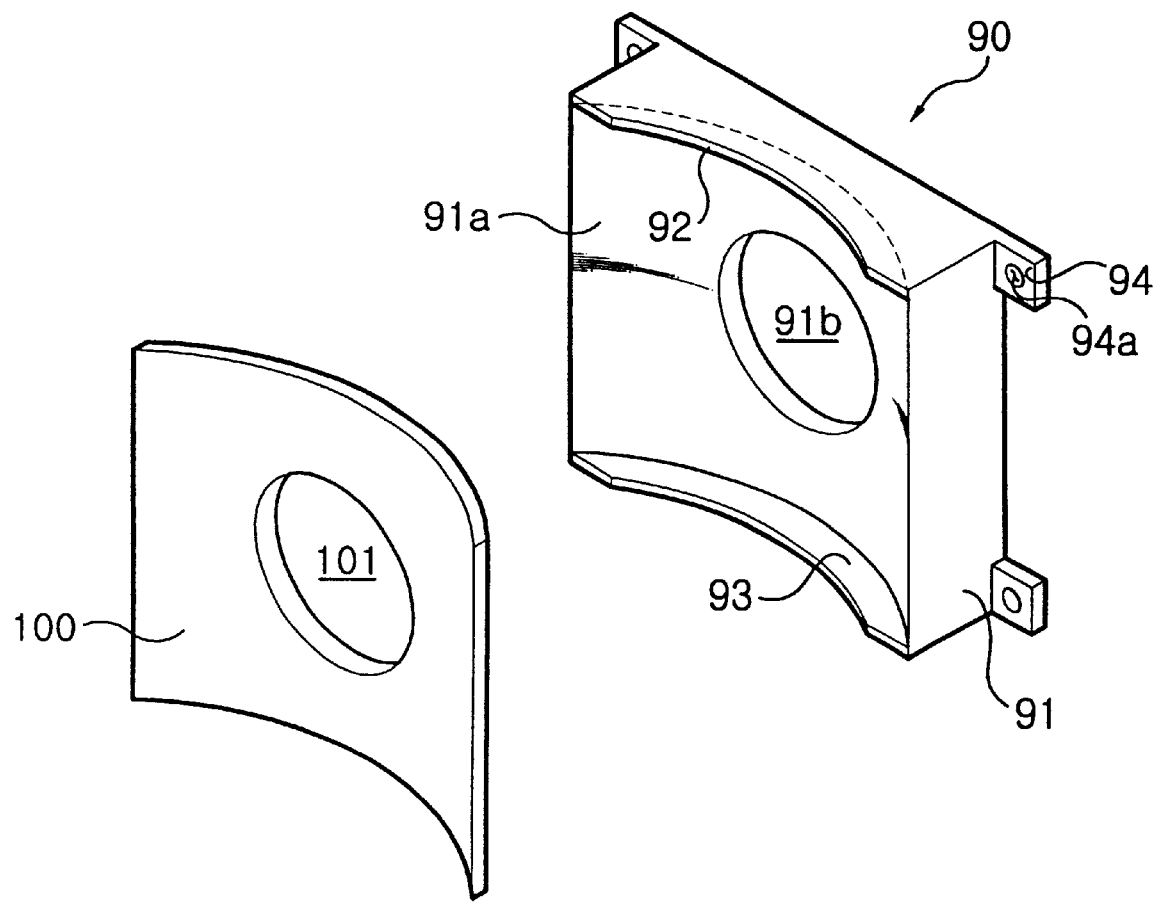
FIG. 4 is a perspective view showing the position securing element.

As shown in FIGS. 3 and 4, the position securing element 90 securely holds the detection coil assemblies 60 and 70, and prevents the detection coil assemblies 60 and 70 from being moved in transversal and longitudinal directions. The position securing element 90 is comprised of a body portion 91 having the same curvature as that of the side surfaces of the detection coil assemblies 60 and 70 so as to be brought into tight contact with the side surface of one of the detection coil assemblies 60 or 70, an upper extension portion 92 extended from the upper end of the body portion 91 to be brought into tight contact with the upper surface of the temperature compensating detection coil assembly 60, a lower extension portion 93 extended from the lower end of the body portion 91 to be brought into tight contact with the lower surface of the magneto-resistance detection coil assembly 70, and a plurality of attachment tabs 94 laterally extended from the side of the body portion 91 to fixedly attach the position securing element 90 to the sensor housing 50.

Figure 5:
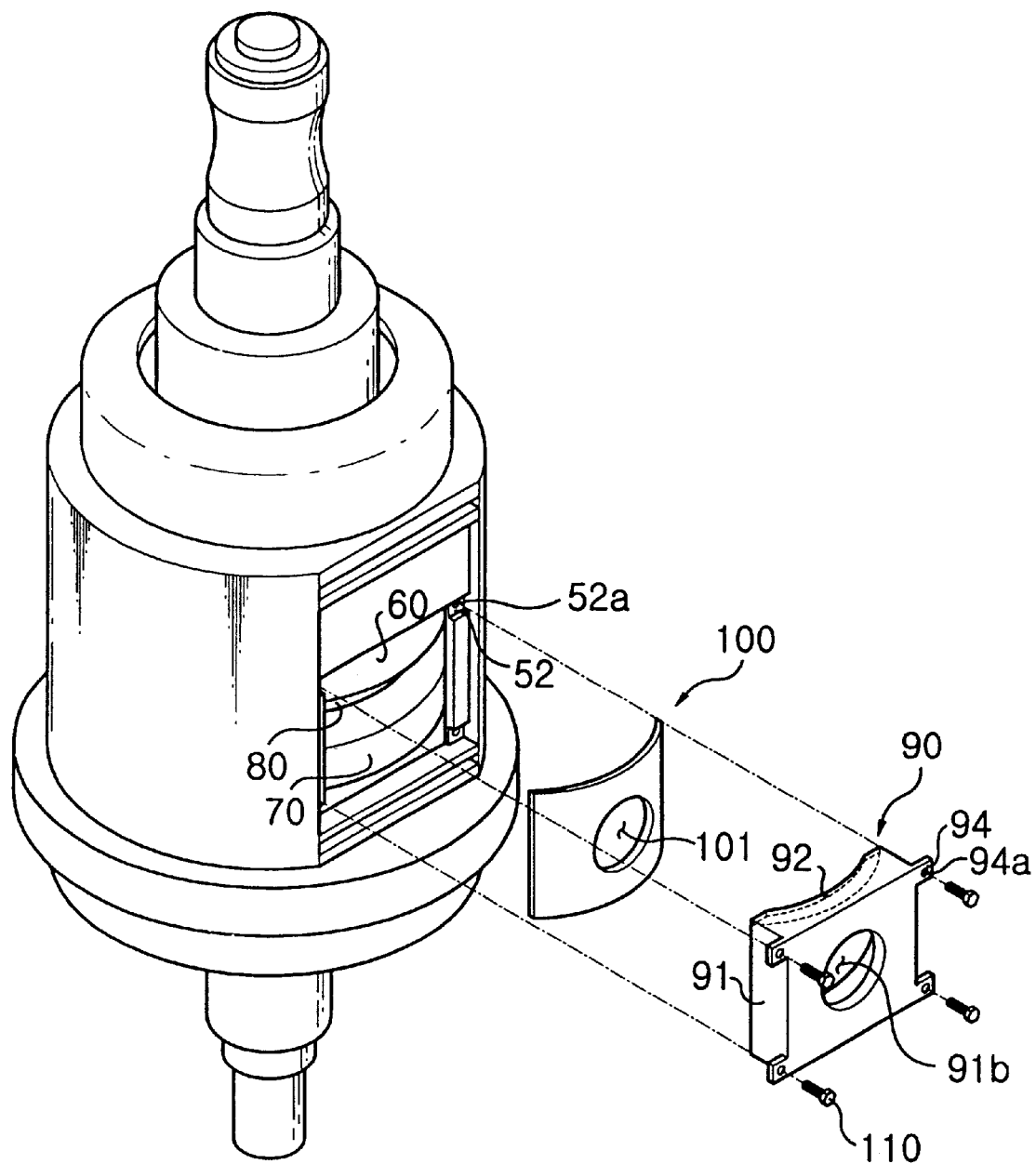
FIG. 5 is a partially exploded perspective view of the torque sensor of the present invention.

The position securing element 90 is inserted through the side of the sensor housing 50. As illustrated in FIG. 5, in order to receive the position securing element 90, an opening 51 is formed on a portion of the side of the sensor housing 50. A plurality of seat portions 52 are provided on the sensor housing 50 at positions beside the opening 51. The attachment tabs 94 are provided with bolt holes 94a, and the seat portions 52 are provided with bolt holes 52a. The position securing element 90 is firmly secured to the sensor housing 50 by a plurality of bolts 110 inserted into the bolt holes 94a and 52a.

A friction plate 100 is interposed between the position securing element 90 and the detection coil assemblies 60 and 70 so as to generate frictional force and secure the positions of the detection coil assemblies 60 and 70. The friction plate 100 is formed of rubber. As a result, the friction plate 100 serves to reduce vibrations caused by the movement of a steering wheel (not shown) and the shock of external impact and transmitted to the detection coil assemblies 60 and 70. Additionally, the friction plate 100 serves to accommodate the different thermal expansions of the sensor housing 50 and the bobbin housings 63 and 73 caused by the heat of the coils 61 and 71. The friction plate 100 has the same curvature as that of the inner surface 91a of the body portion 91 of the position securing element 90 and the side surfaces of the detection coil assemblies 60 and 70 that are brought into contact with the friction plate 100. The provision of the friction plate 100 allows the position securing element 90 to be tightly brought into contact with the detection coil assemblies 60 and 70, and to be interposed between the sensor housing 50 and the bobbin housings 63 and 73.

In addition, the coils 61 and 71 of the detection coil assemblies 60 and 70 are connected by a cable to a signal processing apparatus (not shown) positioned on an appropriate portion of an automobile. A through hole 91b is formed on the center of the body portion 91 of the position securing element 90 to allow the cable to pass through the position securing element 90, and a through hole 101 is formed on the center of the friction element 100 opposite to the through hole 91b for the same purpose.

The operation of the torque sensor of the present invention is described.

If a driver manipulates a steering wheel (not shown) while an automobile equipped with the torque sensor of the present invention is driven, a steering mechanism (not shown) is operated through the output shaft 20 connected to the input shaft 10 by the torsion bar 30 and the direction of the wheels are changed. In such a case, when manipulating force greater than a certain amount is applied to the steering wheel, the torsion bar 30 is twisted because the rotation angle of the output shaft 20 indirectly connected to the steering wheel through the torsion bar 30 is smaller than the rotation angle of the input shaft 10 directly rotated by the steering wheel because of the friction between wheels and the ground. The opposite area of the toothed portions 42a and 43a of the second and third detection rings 42 and 43 is varied, so the inductance value of the magneto-resistance detection coil assembly 70 is varied and, simultaneously, the induced voltage of the coils 61 and 71 is varied.

Such a variation in induced voltage is caused by the variation of magneto-resistance, and inputted to a control unit through the signal processing unit. The control unit measures the difference between the rotational angles of the input and output shafts on the basis of an input signal, and operates power means (not shown) to compensate for the difference.

As described above, the present invention provides a torsion bar for automobiles, in which the provision of the position securing element 90 and the friction plate 100 allows the temperature compensating detection coil assembly 60 and the magneto-resistance detection coil assembly 70 to be securely held in the sensor housing 50 in both longitudinal and transversal directions regardless of the application of vibration or impact from the outside and a temperature variation, thereby being capable of detecting precise torque applied to the torsion bar 30.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A torque sensor for automobiles, comprising:
   a torsion bar for coaxially connecting an input shaft attached to a steering wheel and an output shaft attached to a steering mechanism;
   a plurality of detection rings mounted on circumferential surfaces of said input and output shafts;
   at least one detection coil assembly positioned to surround gaps between said detection rings;
   a sensor housing provided to accommodate said detection coil assembly; and
   a position securing element secured to said sensor housing to be brought into tight contact with a side surface of said detection coil assembly through a side of said sensor housing with a friction plate interposed between said detection coil assembly and said position securing element for securing a position of said detection coil assembly.

2. The torque sensor according to claim 1, wherein said position securing element is provided to surround portions of a side surface of said detection coil assembly, and is provided with an opening to allow said position securing element to be inserted into said sensor housing.

3. The torque sensor according to claim 1, wherein said friction plate is formed to have the same curvature as that of a side surface of said detection coil assembly, and is formed of rubber to absorb vibration applied to said detection coil assembly and accommodate thermal deformation of said detection coil assembly and said sensor housing.

4. The torque sensor according to claim 1, wherein said position securing element is comprised of a body portion having the same curvature as that of a side surface of said detection coil assembly to be brought into tight contact with the side surface of said detection coil assembly, an upper extension portion extended from an upper end of said body portion to be brought in tight contact with an upper surface of said detection coil assembly, a lower extension portion extended from a lower end of said body portion to be brought into tight contact with a lower surface of said detection coil assembly, and a plurality of attachment tabs laterally extended from a side of said body portion to fixedly attach said position securing element to said sensor housing.

5. The torque sensor according to claim 4, wherein said attachment tabs and said sensor housing are each provided with a plurality of bolt holes to fixedly attach said position securing element.

6. The torque sensor according to claim 3, wherein said body portion of the position securing element and said friction plate are each provided with a through hole so as to allow an interior of said sensor housing to communicate with an exterior of said sensor housing.

7. The torque sensor according to claim 4, wherein said body portion of the position securing element and said friction plate are each provided with a through hole so as to allow an interior of said sensor housing to communicate with an exterior of said sensor housing.

8. A torque sensor for automobiles, comprising:
   a torsion bar for coaxially connecting an input shaft attached to a steering wheel and an output shaft attached to a steering mechanism;
   a plurality of detection rings mounted on circumferential surfaces of said input and output shafts;
   at least one detection coil assembly positioned to surround gaps between said detection rings; and
   a sensor housing provided to accommodate said detection coil assembly,
   wherein an opening is formed on a portion of the side of said sensor housing to expose a side surface of said detection coil assembly to the outside, and a position securing element is secured to said sensor housing from the outside through said opening and to be brought into tight contact with the side surface of said detection coil assembly so as to fix said detection coil assembly in said sensor housing.

9. The torque sensor according to claim 8, wherein a friction plate is inserted between said detection coil assembly and said position securing element, which serves to absorb vibrations applied to said detection coil assembly and thermal deformation of said detection coil assembly and said sensor housing.

10. The torque sensor according to claim 8, wherein said friction plate has the same curvature as that of the side surface of said detection coil assembly and is formed of rubber.

11. The torque sensor according to claim 8, wherein said position securing element comprising
    a body portion having the same curvature as that of a side surface of said detection coil assembly to be brought into tight contact with the side surface of said detection coil assembly;
    an upper extension portion extendede from an upper end of said body portion to be brought in tight contact with an upper surface of said detection coil assembly;
    a lower extension portion extended from a lower end of said body portion to be brought into tight contact with a lower surface of said detection coil assembly; and
    a plurality of attachment tabs laterally extended from a side of said body portion to fixedly attach said position securing element to said sensor housing.

12. The torque sensor according to claim 11, wherein said attachment tabs and said sensor housing are each provided with a plurality of bolt holes to fixedly attach said position securing element.

13. The torque sensor according to claim 11, wherein said body portion of the position securing element and said friction plate are each provided with a through hole so as to allow an interior of said sensor housing to communicate with an exterior of said sensor housing.

* * * * *